United States Patent
Bonne et al.

(10) Patent No.: US 6,715,339 B2
(45) Date of Patent: Apr. 6, 2004

(54) SELF-NORMALIZING FLOW SENSOR AND METHOD FOR THE SAME

(75) Inventors: Ulrich Bonne, Hopkins, MN (US); David Kubisiak, Chanhassen, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/348,053

(22) Filed: Jan. 21, 2003

(65) Prior Publication Data

US 2003/0106380 A1 Jun. 12, 2003

Related U.S. Application Data

(62) Division of application No. 09/886,333, filed on Jun. 21, 2001, now Pat. No. 6,553,808, which is a division of application No. 09/482,441, filed on Jan. 10, 2000, now Pat. No. 6,308,553.
(60) Provisional application No. 60/137,464, filed on Jun. 4, 1999.

(51) Int. Cl.$^7$ .................. G01N 29/02; G01N 11/10; G01N 9/00
(52) U.S. Cl. ............ 73/24.01; 73/24.05; 73/54.24; 73/64.53
(58) Field of Search ............... 73/1.34, 1.35, 73/202, 202.5, 861.04, 861.351, 861.352, 861.353, 861.354, 861.355, 861.356, 19.03, 19.04, 24.01, 24.05, 24.06, 25.05, 30.01, 30.03, 30.04, 32 A, 64.53, 54.23, 54.24, 54.25, 54.26

(56) References Cited

U.S. PATENT DOCUMENTS

| | | | |
|---|---|---|---|
| 2,653,471 A | * | 9/1953 | Clewell .............. 73/24.01 |
| 3,295,360 A | * | 1/1967 | Dimeff .............. 73/24.05 |
| 3,500,849 A | | 3/1970 | McLeod |
| 3,505,885 A | * | 4/1970 | Rolland .............. 73/24.01 |
| 3,623,357 A | * | 11/1971 | Abbotts .............. 73/32 R |

(List continued on next page.)

FOREIGN PATENT DOCUMENTS

| | | | |
|---|---|---|---|
| EP | 0 373 964 A2 A3 | 6/1990 | |
| JP | 03092747 A | * 4/1991 | ............. 73/32 A |
| JP | 04 050568 A | 2/1992 | |
| WO | WO 88 03059 A | 5/1988 | |

OTHER PUBLICATIONS

Bonne, "Fully Compensated Flow Microsensor For Electronic Gas Metering", 1992 Intl. Gas Research Conference, Proceedings, vol. III, p. 859.
"Microbridge Airflow Sensors Using a Bypass to Measure Higher Flows—Note #2", Honeywell, Micro Switch Sensing and Control. 1 pg.
"Airflow Sensors Microbridge Mass Airflow/Unamplified and Amplified", AWM40000 Series Order Guide, pp. 68–69.
Product Catalog page, Audible Signal Devices, International Communications Corporation, p. 1072 Allied.
Bonne, "Sensing Fuel Properties with Thermal Microsensors", Smart Electronics & Mems Conference, Feb. 1996, Paper No. 2722–24.

Primary Examiner—Michael Cygan
(74) Attorney, Agent, or Firm—Kris T. Fredrick

(57) ABSTRACT

An apparatus to normalize a flow rate of a fluid in a main flow channel is provided. The apparatus uses a movable member, such as a flexible membrane disposed for reciprocating displacement, to produce a constant dither flow of the fluid that is independent of fluid composition. This dither flow generates a signal output from a normalizing flow sensor that both represents a characteristic property of the fluid and a flow rate calibration factor. A similar apparatus to determine the characteristic property or flow rate calibration factor is also provided. The devices disclosed may be used in numerous industrial, process, and medical flow system applications for normalization of flow sensors and to derive other properties of a fluid.

14 Claims, 14 Drawing Sheets

U.S. PATENT DOCUMENTS

| | | |
|---|---|---|
| 3,756,068 A | 9/1973 | Villarroel et al. |
| 3,885,415 A | 5/1975 | Burns et al. |
| 3,903,731 A * | 9/1975 | Sieben .................. 73/54.24 |
| 3,924,612 A | 12/1975 | Dempster et al. |
| 4,150,561 A * | 4/1979 | Zupanick ................ 73/24.01 |
| 4,457,162 A * | 7/1984 | Rush et al. ............. 73/24.01 |
| 5,311,447 A | 5/1994 | Bonne |
| 5,386,714 A * | 2/1995 | Dames ................... 73/24.05 |
| 5,551,282 A | 9/1996 | Vander Heyden |
| 5,861,561 A | 1/1999 | Van Cleve et al. |
| 5,892,143 A * | 4/1999 | Namerikawa et al. ..... 73/54.24 |
| 6,016,686 A | 1/2000 | Thundat |
| 6,148,658 A | 11/2000 | Chou |
| 6,250,132 B1 | 6/2001 | Drzewiecki |

* cited by examiner

SELF-NORMALIZING FLOW SENSOR AND METHOD FOR THE SAME

CROSS-REFERENCE TO RELATED APPLICATIONS

This Application is a divisional of parent application Ser. No. 09/886,333, filed Jun. 21, 2001, now U.S. Pat. No. 6,553,808, which is a divisional of application Ser. No. 09/482,441, filed Jan. 10, 2000, now issued as U.S. Pat. No. 6,308,553 on Oct. 30, 2001, which claimed the priority benefit of U.S. provisional application Ser. No. 60/137,464, filed Jun. 4, 1999. All of these documents are herein incorporated by reference.

BACKGROUND OF THE INVENTION

1. Field of the Invention

The present invention relates generally to flow sensors and, more particularly, to self-normalizing flow sensors and methods of use thereof.

2. Description of Related Technology

Sensors have been used to measure flow rates in various medical, process, and industrial applications, ranging from portable ventilators supplying anesthetizing agents to large-scale processing plants in a chemical plant. In these applications, flow control is an inherent aspect of proper operation which is achieved in part by using flow sensors to measure the flow rate of a fluid within the flow system. In many flow systems, e.g., fuel gas flow systems containing a binary mixture of methanol and water, the chemical composition of the fluid may change frequently. Also, a flow system is often required to flow more than one fluid having different chemical and thermophysical properties. For example, in a semiconductor processing system that passes a $N_2$ gas, the $N_2$ gas may at times be replaced by a $H_2$ or He gas, depending on the needs of the process; or in a natural gas metering system, the composition of the natural gas may change due to non-uniform concentration profiles of the gas.

Measuring the flow rates of fluids of differing chemical compositions, i.e., differing in density, thermal conductivity, specific heat, etc., requires calibrations of the flow sensor. Without recalibration, the flow sensor could produce accurate flow rate measurements for one fluid but not another. Typically, flow sensors are calibrated upon their initial operation and, as such, are calibrated to compute accurate flow rate values only for fluids with a particular, narrow range of chemical composition.

Known ways of re-calibrating a flow sensor, or providing a calibrated flow rate measurement, do exist. In some instances, customers provide flow sensor manufacturers with information on the composition of each fluid to be measured by the flow sensor. From this information, manufactures perform calibration tests and obtain data for use in making calibration functions, or look-up tables, from which the flow rate sensor can be calibrated. In other instances, previously installed flow sensors will be taken off-line so that a recalibration for a new fluid can be performed. This process essentially reinitializes a flow sensor for accurate measurement with respect to fluids having differing chemical compositions and, therefore, is a costly and inconvenient option for customers.

An on-line calibration technique had been developed using a property sensor, i.e., a thermal sensor, to measure the specific heat and thermal conductivity properties of a fluid and a flow sensor to measure an uncalibrated flow rate. The specific heat and thermal conductivity (along with absolute temperature and Prandtl No.) are related to a flow rate correction factor, $C_v$, by a known equation. Therefore, these property sensors, connected to a flow channel through a dead-end recessed cavity into which fluid enters principally by diffusion, measure values which must then be applied to expensive and time-consuming computational circuitry or microprocessors before the correction factor, $C_v$, and subsequent calibrated flow signal can be produced.

The calibration correction factor, $C_v$, is related to the calibrated flow rate by the following expression: $V_c = V_u/C_v$, where $V_u$ is the uncalibrated flow rate measured by a flow sensor in the main flow channel and $V_c$ is the calibrated flow rate. Using $C_v$ is helpful because the correction factor is not dependent of the flow rate, and only depends on the chemical composition and properties of the fluid, primarily the thermal conductivity and specific heat of the fluid.

The flow sensor measuring the uncalibrated flow rate, is typically a thermal anemometer, which measures the difference in temperature between upstream and downstream sensing elements by measuring the differences in resistance between each sensor. Relative temperature changes between the two sensors result from convection effects that occur due to the flow of the fluid passing by the heated elements. From this difference, the raw or "uncalibrated" flow sensor signal and flow rate of a fluid can be derived. If only a single fluid is to be measured, then one could set the $C_v=1$ assuming the sensor had been initially calibrated to measure this fluid. However, if other fluid compositions are to be measured, then the determination of $C_v$ for these fluids is required.

This known technique of measuring thermal conductivity and specific heat, calculating a correction factor based on these values, and then deriving a normalized flow rate is costly and slow due to the complexity of the data processing involved. The relationship between $C_V$, specific heat, and thermal conductivity requires substantial computing power to derive the former from the latter two. Slow response time is a particular problem in many applications in which the composition of the fluid may change naturally from minute to minute, a condition that frequently occurs in flow systems in which the fluid is natural gas, gasoline, fuel oil, or other chemical binary, tertiary, or quaternary mixtures.

The present invention is directed to a flow sensor which can be self-normalized to produce accurate flow rate measurements for varying types of fluids, both liquid and gaseous, and to be able to produce such measurements at an affordable cost and with a relatively short response time.

SUMMARY OF THE INVENTION

In accordance with an aspect of the invention, an apparatus for use in normalizing a main flow rate of a fluid in a main flow channel is disclosed. The apparatus comprises a normalizing flow sensor and a moveable member. The normalizing flow sensor measures a dither flow rate of the fluid as the fluid flows. The moveable member is disposed for producing the dither flow rate. The dither flow rate is substantially independent of the flow rate in the main flow channel and is substantially independent of the fluid composition.

In accordance with another aspect of the invention, a self-normalizing flow sensor apparatus for use in measuring a main flow rate of a fluid in a main flow channel is disclosed. The apparatus comprises a main flow sensor, a normalization flow sensor, and a movable member. The main flow sensor measures the flow rate of the fluid in the main flow channel. The normalization flow sensor measures a dither flow rate of the fluid in response to a dither flow of the fluid. A dither flow rate of the dither flow is substantially independent of the flow rate of the fluid in the main flow channel. The movable member is disposed for reciprocating movement so as to produce the dither flow of the fluid.

In accordance with yet another aspect of the invention, a normalizing flow sensor comprising a flexible membrane disposed for reciprocating movement is disclosed. The flexible membrane produces a dither flow of a fluid near said flow senor, such that the dither flow is substantially independent of fluid composition. The normalizing flow sensor measures the dither flow rate of said fluid.

In accordance with still another aspect of the invention, a method of normalizing a flow sensor that measures a flow rate of a fluid in a flow channel comprises the following steps: receiving a portion of the fluid from the flow channel; moving a membrane according to known displacement to create a dither flow of the received portion; measuring a dither flow rate of said dithered received portion; and communicating said dither flow rate to a processor which uses the dither flow rate to compute a normalized flow rate.

In accordance with a further aspect of the invention, a method of measuring a chemical component in a fluid flowing in a flow system comprises the following steps: receiving a portion of said fluid from said flow channel; creating a dither flow of said received portion; measuring a dither flow rate of said dithered fluid; and determining the concentration in a binary mixture based upon the measured dither flow rate.

In accordance with a further aspect of the invention, a method of determining a higher value property of a fluid, the method comprising the flowing steps: receiving a portion of said fluid from said flow channel; creating a dither flow of said received portion; measuring a dither flow rate of said dithered fluid; and determining said higher value property based upon the measured dither flow rate and other measured properties.

DETAILED DESCRIPTION OF THE EMBODIMENTS

Figure 1:
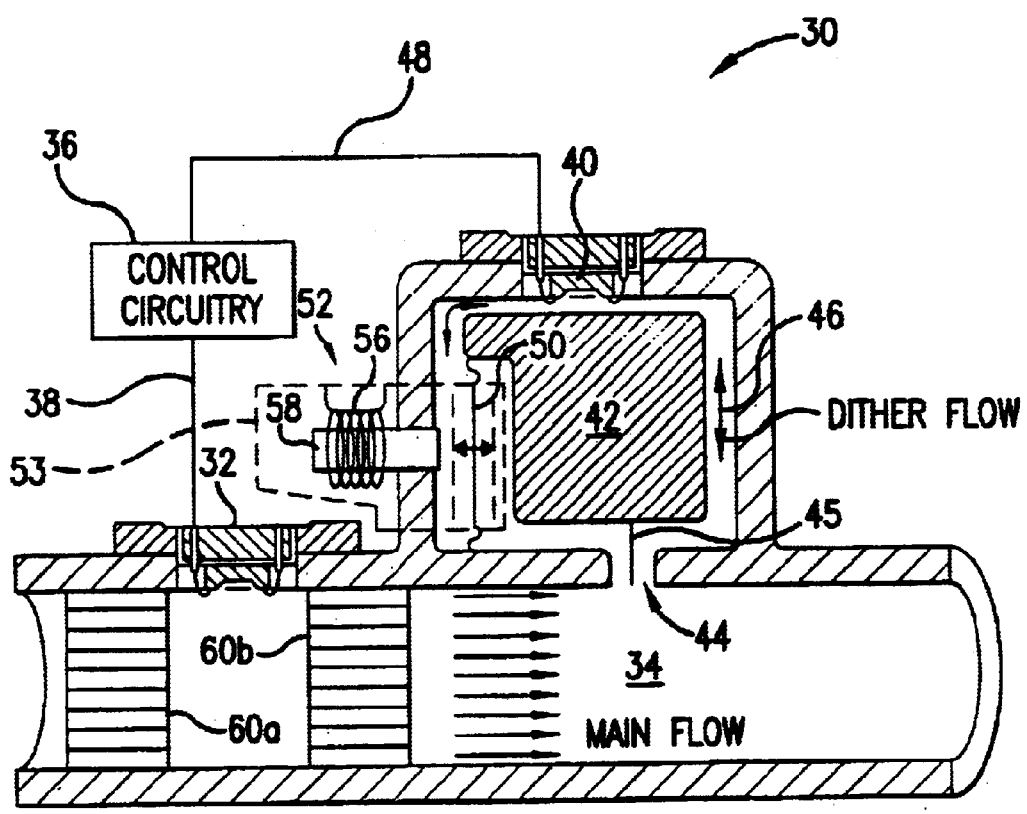
FIG. 1 is a cross-sectional view of the general concept of the present invention showing a flow rate sensor that measures an uncalibrated flow rate, a dither flow rate-producing membrane, and a-normalizing sensor for measuring a calibration value derived from the dither flow rate.

To overcome the disadvantages of the prior art discussed above, a first self-normalizing flow sensor device 30 that directly measures the calibration, or correction factor $C_v$, for normalizing the measured flow rate of a main flow sensor 32 is provided in FIG. 1. As will be apparent from the following description, the apparatuses disclosed below may be used in numerous in medical, process, and industrial applications. Furthermore, it will be apparent from the description that the calibration factor may also be used to derive other properties of a fluid, such as the concentration of a chemical composition in a binary mixture fluid, or "higher value" properties (compressibility factor, density, viscosity, heating value, oxygen demand, octane number, and cetane number). In fact, numerous types of implementations of the invention will be apparent from the description and claims that follow. These implementations are considered with the scope of the present invention.

The first self-normalizing flow sensor device 30 of FIG. 1 is a general depiction of an embodiment of the invention. The first self-normalizing flow sensor device 30 includes a main flow channel 34 through which a fluid, gaseous or liquid, will travel. The main flow channel 34 is compatible for use with existing flow systems, and as such is shaped in a circular cross-sectional shape of uniform cross-sectional size throughout the length of the flow channel 34. The main flow channel 34, however, can be of varying size, that is of smaller or larger cross-sectional size at certain locations to alter the flow rate range capability accordingly. Though not shown, it will be appreciated by persons of ordinary skill in the art that the flow channel 34 can be terminated with inlet and outlet mounts, such as threadable mounts, for affixing the first self-normalizing flow sensor device 30 into such an existing flow system. The preferred direction of fluid flow in the flow channel 34 is shown by arrows.

In operation, the first self-normalizing flow sensor device 30 determines a calibrated flow rate. Therefore, disposed along an upper wall of the flow channel 34 is the flow sensor 32 for measuring the flow rate of the fluid traveling through the flow channel 34. The flow sensor 32 can be one of numerous types of flow sensors, such as optical flow sensors, orifice-based flow sensors, delta-pressure sensors across an orifice or across a laminar flow restriction, and Picot tubes, but is preferably a hot-element thermal anemometer in the form of a microbridge flow sensor, such as the AWM43300 made by the Micro Switch Division of Honeywell Inc., which has the advantage of accurate measurement and prolonged lifetime in comparison to other flow sensors that are more susceptible to damage and contamination effects. This off-the-shelf thermal anemometer is also inexpensive. The flow sensor 32 is exemplarily shown connected to control circuitry 36 via an electrical connection 38 and an electrical connection 39. both of which may comprise multiple leads, as shown by example in FIG. 2.

The first self-normalizing flow sensor device 30 also comprises a normalizing flow sensor 40 disposed in a dither chamber 42 connected to the flow channel 34 via a sensing tap 44 formed of a single opening in the main flow channel 34. The normalizing flow sensor 40 can be identical to the flow sensor 32, and, therefore, as with the main flow sensor 32, the normalizing flow sensor 40 can take any number of forms, including those listed above with respect to the flow sensor 32, but is preferably a microbridge flow sensor. Preferably, the main flow sensor 32 is identical to the normalizing flow sensor 40. The signal measured by the normalizing flow sensor 40 is used to calibrate the signal measured by the flow sensor 32. The dither chamber 42 defines a dither sensing channel 46 to which the normalizing flow sensor 40 is connected. Under pressure equalization operating conditions, a portion of the fluid flowing in the flow channel 34 diffuses into the dither chamber 42 through the sensing tap 44, with the sensing tap 44 being sized so that the fluid in the dither chamber 42 is substantially free of any turbulence effects occurring in the flow channel 34. The sensing tap 44 provides equalization between the flow channel 34 and the dither channel 46 so that no compositional, temperature, or pressure gradients exist between the two channels. Because the normalizing flow sensor 40 is used to normalize the measurements of the flow sensor 32, the normalizing flow sensor 40 must measure the same fluid that is being measured by the flow sensor 32, i.e., a fluid of identical thermophysical properties. An optional exchange wall 45 can also be disposed in the dither sensing channel 46 and extending to the tap 44 to direct ingress and egress of the fluid diffusing into the dither channel 46.

In normalizing the output of the flow sensor 32, the normalizing flow sensor 40 measures the calibration factor, $C_v$, which is related to physical properties, such as density, specific heat and thermal conductivity, of the fluid. This correction factor is communicated to the control circuitry 36 via lead 48, 50 that the control circuitry 36 can perform the calculation necessary to derive the calibrated flow rate, i.e. $V_C = V_U/C_v$, where $V_U$, is the uncalibrated flow rate and $V_C$ is the calibrated flow rate. Moreover, the conditions in the dither chamber 42 and the sensing channel 46 should be such that what is measured by the normalizing flow sensor 40 is substantially independent of flow rate. To achieve this condition, a dither membrane 50 is disposed for vibratory movement in the dither chamber 42. In the example of FIG. 1, the dither chamber 42 defines the sensing channel 46, and the dither membrane 50 15 displaces a constant volume (or mass under special conditions) in a periodic or reciprocating manner generating intermittent forward and reverse flow rates in the dither sensing channel 46. The preferred direction of the dither flow is shown by anows. The dither flow created by the membrane 50 is of constant magnitude and repeating, i.e., the displaced volume or mass is substantially without variation per stroke and substantially independent of time and fluid 20 properties, such as pressure, temperature, and fluid composition. Fluid composition refers to the chemical make-up of the fluid. Combining the effect of the dither membrane 50 with the non-positive displacement normalizing flow sensor 40, it is apparent that what is disclosed by the invention is a heretofore non-existent apparatus for creating a positive displacement flow sensor device from a non-positive displacement flow sensor combined with a dither membrane of known volumetric displacement.

A driver 52 drives the dither membrane 50. The driver 52 may be a momentum driven mechanism, thermal expansion driven mechanism, pistonically driven pump, piezo-electric driven pump, electromagnetic driven pump, or other suitable device. The driver 52 and the membrane 50 form the actuator 53. To reduce costs, the actuator 53 is preferably an earphone speaker 54 (See FIG. 6) driven by a sinusoidal or triangular wave input signal that produces constant (AC sinusoidal or square-wave, respectively) periodic motion in the membrane 50. In FIG. 1. an actuator is generally shown as a magnetic coil 56 and a bobbin 58 is disposed for moving the membrane 50.

As the membrane 50 vibrates, a dither flow rate of the fluid, that is substantially independent of the flow rate of the fluid in the flow channel 34 is produced and measured by the flow sensor 40. The peak-to-peak displacement of the reciprocating membrane 50 can occur over a wide range so long as it is constant and substantially independent of the factors identified above.

For laminarizing the flow of the fluid in the flow channel 34, two honeycomb flow restrictors 60a, 60b are placed in the flow channel 34 upstream and downstream of the flow sensor 32, respectively. These flow restrictors reduce turbulence within the flow channel 34 so that less noise is measured and less output signal fluctuation occurs at the flow sensor 32. Laminarizing the flow in this way also reduces the presence of turbulence effects in the dither sensing channel 46.

Figure 2:
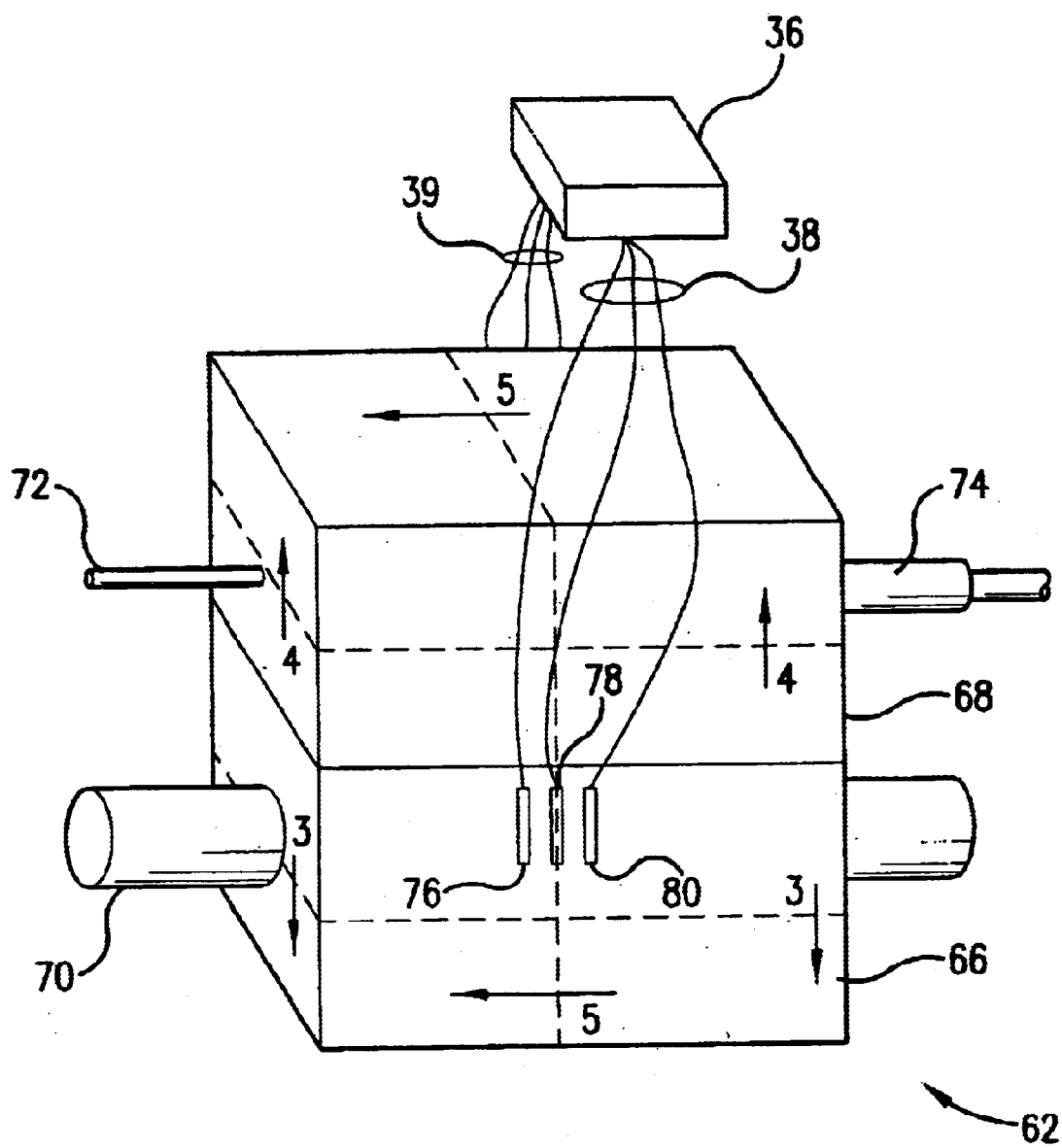
FIG. 2 is a three-dimensional view of the exterior of a flow sensor normalizing apparatus formed of modular flow channel and dither channel sections according to an embodiment of the invention.
Figure 3:
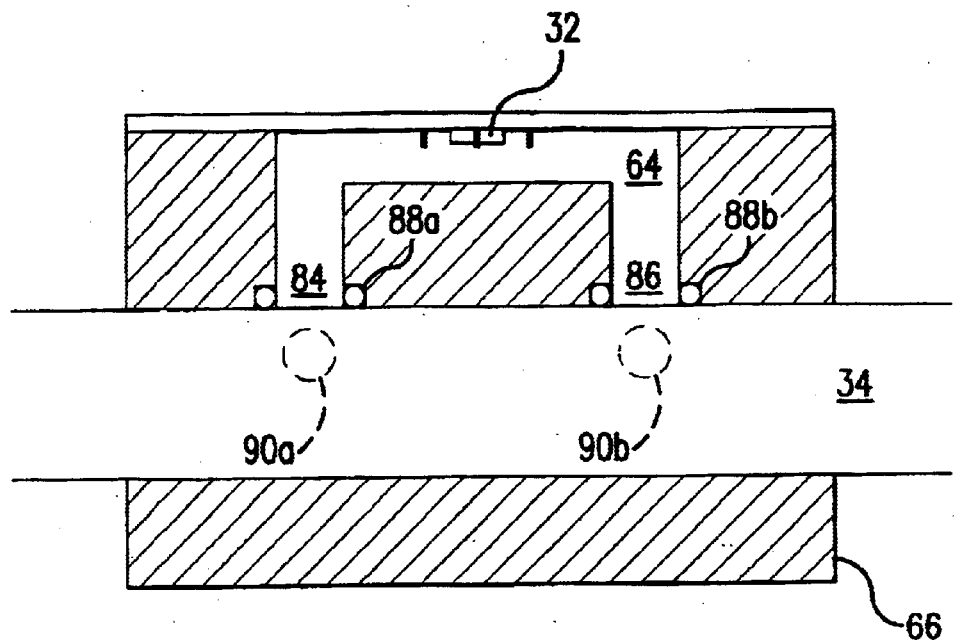
FIG. 3 is a cross-sectional top view of the flow channel section of FIG. 2 (cut along 3 and looking in the direction of the arrows) showing a flow rate sensor disposed in a sensing channel connected to a flow channel.

The exterior of a second self-normalizing flow sensor device 62 is shown in FIG. 2. The second self-normalizing flow sensor device 62 differs principally from that of FIG. 1 in that the flow sensor 32 is disposed in a bypass channel 64 parallel to the flow channel 34 (FIG. 3). The second self-normalizing flow sensor device 62 is shown formed of two sections, a flow channel section 66 and a dither channel section 68. This multiple section depiction, however, is done to better convey the operation of the second self-normalizing flow sensor device 62, and should not be construed as limiting the ways in which the second self-normalizing flow sensor device 62 or the more general first self-normalizing flow sensor device 30 may be implemented. Either the first self-normalizing flow sensor device 30 or the second self-normalizing flow sensor device 62 could be formed of a single section or multiple sections and still be within the scope of the invention.

Figure 4:
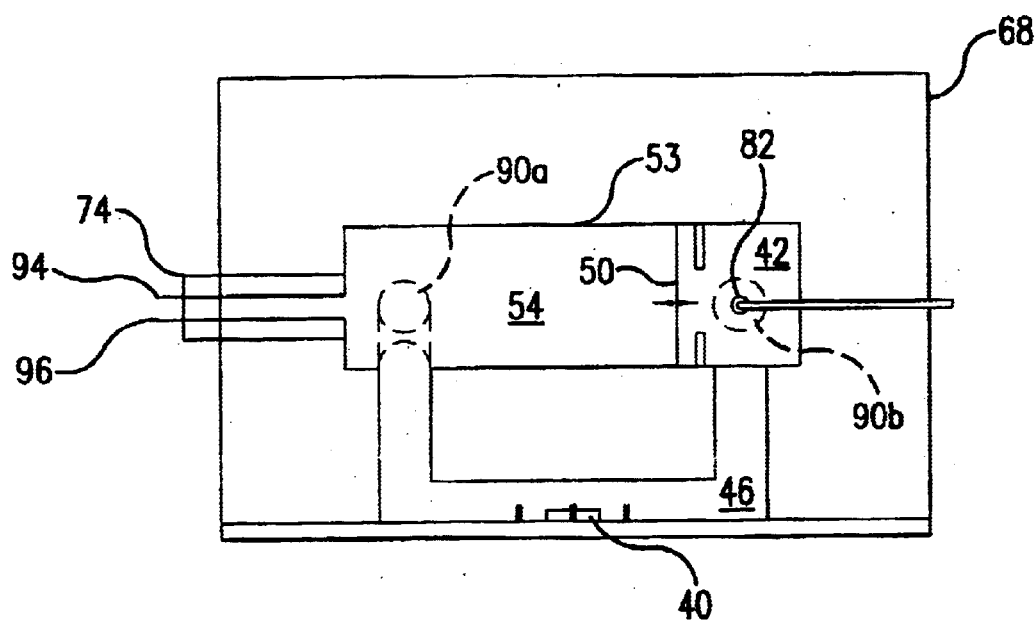
FIG. 4 is a cross-sectional bottom view of the dither channel section of FIG. 2 (cut along 4 and looking in the direction of the arrows) showing a dither membrane in a dither chamber disposed above the flow channel of FIG. 2. A normalizing sensor in connection to the dither chamber is also shown.

A flow tube 70, also provided with honeycomb flow straighteners, defines the flow channel 34 of section 66, while a bleed valve 72 and an actuator I/O connector 74 are shown extending from the section 68. Three leads of the flow sensor 32 (not shown), an output lead 76, an input lead 78, and a ground 80, are disposed on the exterior of the second self-normalizing flow sensor device 62 for attaching the flow sensor 32 to the external control circuitry 36. For example, the input lead 78 can supply +10 V to the heater for raising it to the typical 160° C. operating temperature. In a similar manner, three identical leads at the rear surface of the second self-normalizing flow sensor device 62 connect to the normalizing flow sensor 40. The bleed valve 72 is optional, though preferred. The bleed valve 72 is a small rod connected to open and close a bleed hole 82, or purge hole, in the dither chamber 42 (FIG. 4).

A cross-sectional view of the section 66 is shown in FIG. 3. The bypass channel 64 connects to the flow channel 34 at an inlet 84 and a outlet 86. The inlet 84 and outlet 86 are of a circular cross-sectional shape. O-rings 88a, 88b maintain a substantially air-tight, affixed connection at the inlet 84 and the outlet 86, respectively. These O-rings 88a, 88b are employed because the preferred embodiment uses off-the-shelf sensors which must be affixed to the flow channel 34 to form the second self-normalizing flow sensor device 62. However, depending on design, they may not be advantageous.

The operation of the flow sensor 32 in this bypass configuration is similar to that of FIG. 1, in that both measure the flow rate of a portion of the fluid flowing past a flow sensor. The bypass configuration is useful, however, because it reduces the likelihood of the flow sensor 32 being damaged by high velocity fluid flow or contamination which can occur to sensors disposed within the flow channel 34. Furthermore, the bypass configuration allows high flow rates through the flow channel 34 because only a portion of this flowing fluid passes through the sensing channel 64. The second self-normalizing flow sensor device 62, for example, can be operated accurately at flow rates in excess of 200 ltrs/min. Alternatively, with the flow sensor 32 disposed in the flow channel 34, as in FIG. 1, only flow rates on the order of 1 ltr/min can be accurately measured before the flow sensor 32 becomes saturated.

Two ports, a dither inlet 90a and a bleed outlet 90b, connecting the flow channel 34 to the dither sensing channel 46, are shown in phantom and can meet the flow channel 34 at O-ring connections like those at inlet 84 and outlet 86 of the sensing channel 64. The dither inlet 90a acts as a port, via flow segments extending perpendicularly from FIG. 3, to the same identified port of FIG. 4 which in turn leads to the sensing channel 46. A portion of the fluid in the flow channel 34 diffuses into the sensing channel 46 via inlet 90a, through a zero-sum exchange. The bleed outlet 90b is similarly disposed as shown in FIGS. 3 and 4, and also connects to the sensing channel 46. The bleed outlet 90b differs, however, from that of the dither inlet 90a in that the bleed outlet 90b is completely capped to prevent ingress and egress of the fluid to the flow channel 34 except through the small bleed hole 82 which is opened and closed by the bleed valve 72. The ports 90a, 90b define the dither channel 46 housing the normalization sensor 40.

In the open position, the bleed hole 82 purges the dither chamber 42 to the flow channel 34, thus, leaving the dither sensing channel 46 with a small bypass outlet to the flow channel 34. This purging is beneficial when the second self-normalizing flow sensor device 62 is going to measure flow rate of a fluid of different thermophysical properties than the fluid it had most recently been measuring. When the bleed hole 82 is in the closed position, the dither sensing channel 46 is a completely dead-end cavity.

In FIG. 4, the dither membrane 50 is disposed at one end of the actuator 53, which is operated via two leads 94, 96 connecting to the actuator I/O connector 74. With the actuator 53 being formed by the earphone speaker 54 (FIG. 6), for example, the two leads 94, 96 could be connected to an AC signal source for driving the membrane at frequencies between 10 to 700 Hz, with a preferred range of linear operation of the second self-normalizing flow sensor device 62 in the 40 to 100 Hz range.

Figure 5:
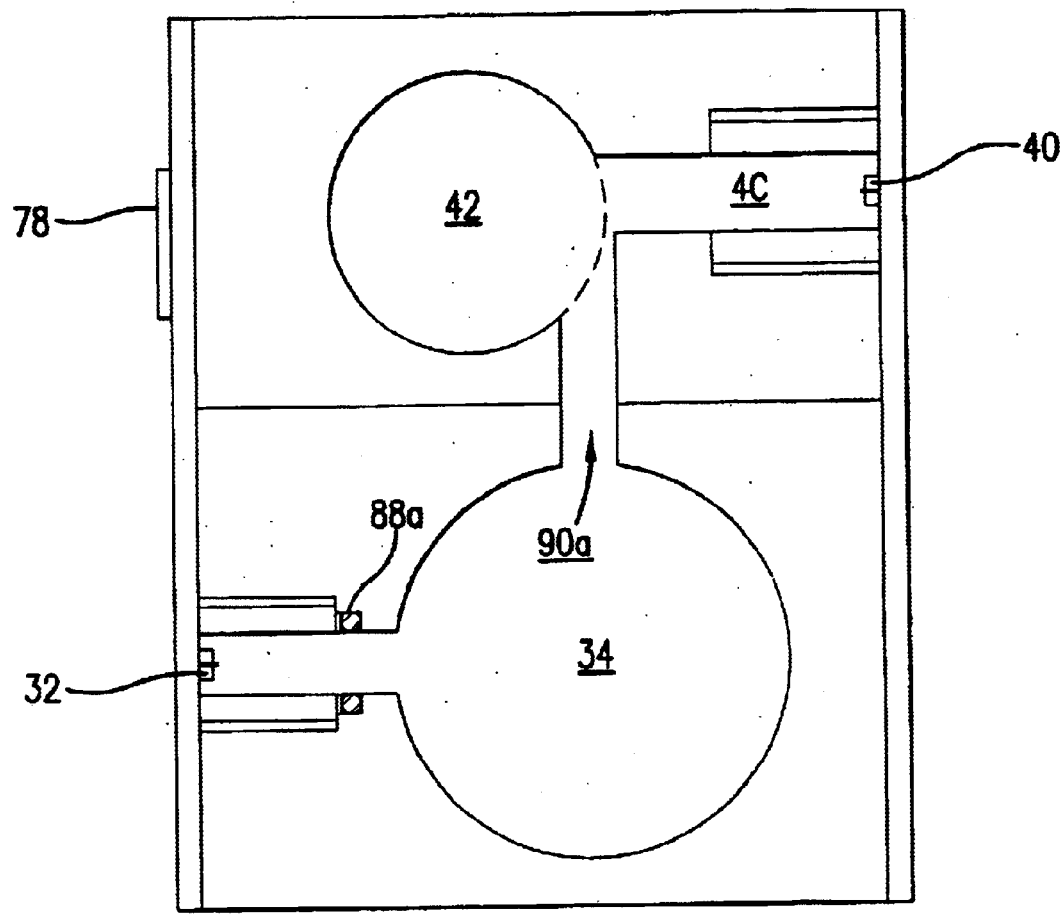
FIG. 5 is a cross-sectional side view of the flow sensor normalizing apparatus of FIG. 2 (cut along 5 and looking in the direction of the arrows) showing a cross-sectional view of both the flow channel section and the dither channel section.

FIG. 5 shows a cross-sectional view of both the section 66 and the section 68 when combined for operation. The view of FIG. 5 is orthogonal to the views of FIGS. 3 and 4.

Figure 6:
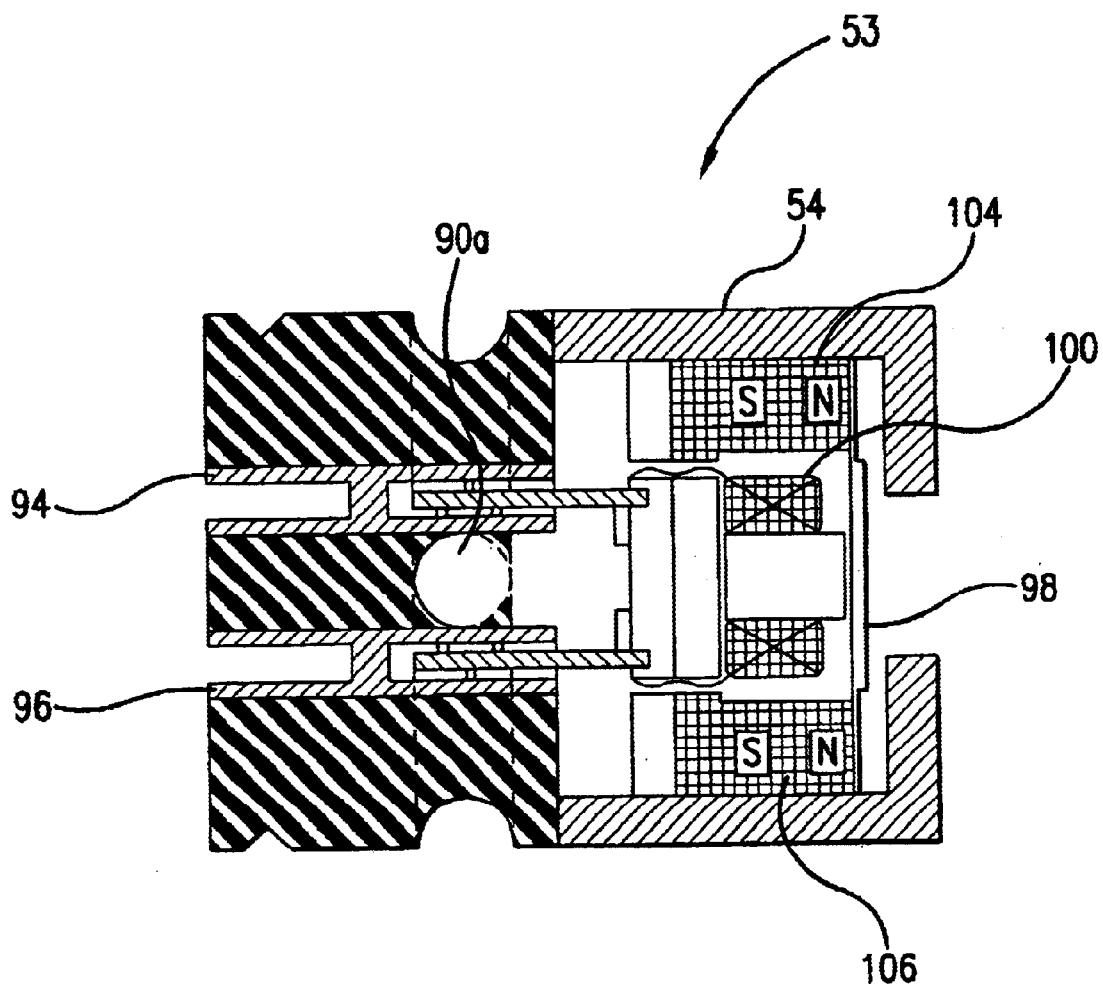
FIG. 6 is an expanded and detailed view of an exemplary actuator that reciprocally moves the dither membrane according to an embodiment of the present invention.

Referring to FIG. 6, a circular steel diaphragm 98 of the earphone speaker 54 acts as the dithering membrane 50. The two leads 94, 96 extend from the actuator I/O connector 74 to a wound coil bobbin 100. As will be appreciated by persons of ordinary skill in the art, an AC signal applied to the bobbin 100 produces an oscillating electromagnetic field through magnets 104, 106 and the bobbin 100 which will cause the diaphragm 98 to vibrate in a reciprocating, pistonic motion. The diaphragm 98, and thus the membrane 50, can be driven over a wide range of frequencies. However, in this preferred embodiment that range extends below the resonance, or eigen, frequencies of the membrane, magnets, and other speaker components, i.e., approximately 2000 Hz. Opposite ends of the diaphragm 98 of FIG. 6, or diaphragm 50 of FIG. 4 or 5, are connected via channels 46 to the normalizing flow sensor 40.

Figure 7:
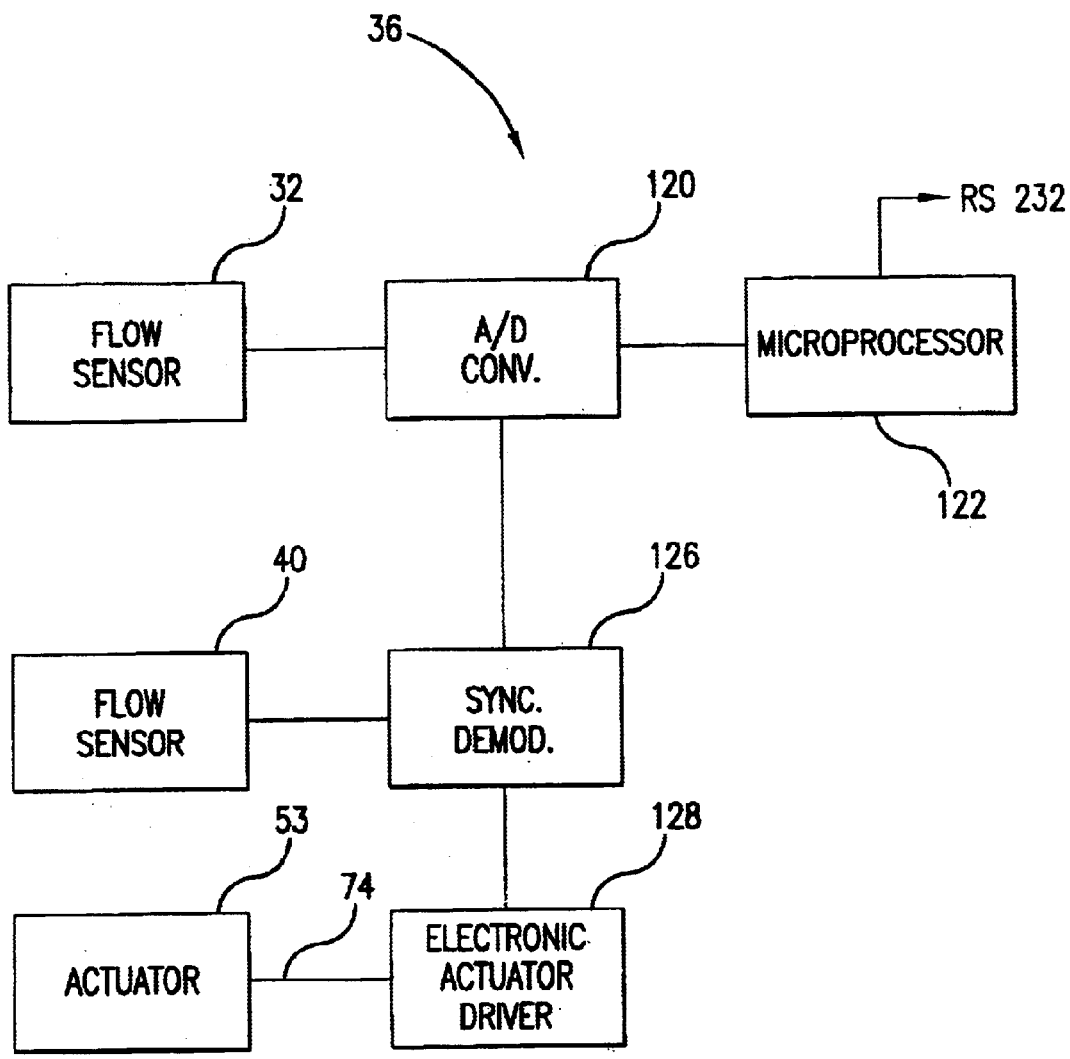
FIG. 7 is an exemplary block diagram of the control circuitry of FIG. 1 which computes the calibrated flow rate.

An exemplary block diagram of the control circuitry 36 is provided in FIG. 7. The flow sensor 32 is connected to an A/D converter block 120 which receives an analog signal representing the measured uncalibrated flow rate and communicates a corresponding digital signal to a microprocessor block 122. The correction factor is derived from the output measured by the normalizing flow sensor 40 at a synchronous demodulator block 126 communicating therewith, is communicated to the microprocessor block 122 via converter block 120, as well. The synchronous demodulator block 126 demodulates the AC signal from the normalizing flow sensor 40 by amplifying a modulation frequency equal to the actuator drive frequency output by an electronic actuator driver 128, thus reducing the bandwidth of the noise of the AC signal. The demodulator block 126 outputs an RMS signal to the A/D converter block 120. The electronic actuator driver block 128 functions as an electronic signal generator, providing a constant frequency and constant voltage output to the actuator 53 via the actuator I/O connector 74. In addition, the electronic actuator driver block 128, communicates data regarding the input signal to the actuator 53, such as the driving frequency to the synchronous demodulator block 126, for rectifying or creating the RMS output of the normalizing flow sensor 40, this signal being the correction factor, $C_v$.

Figure 13:
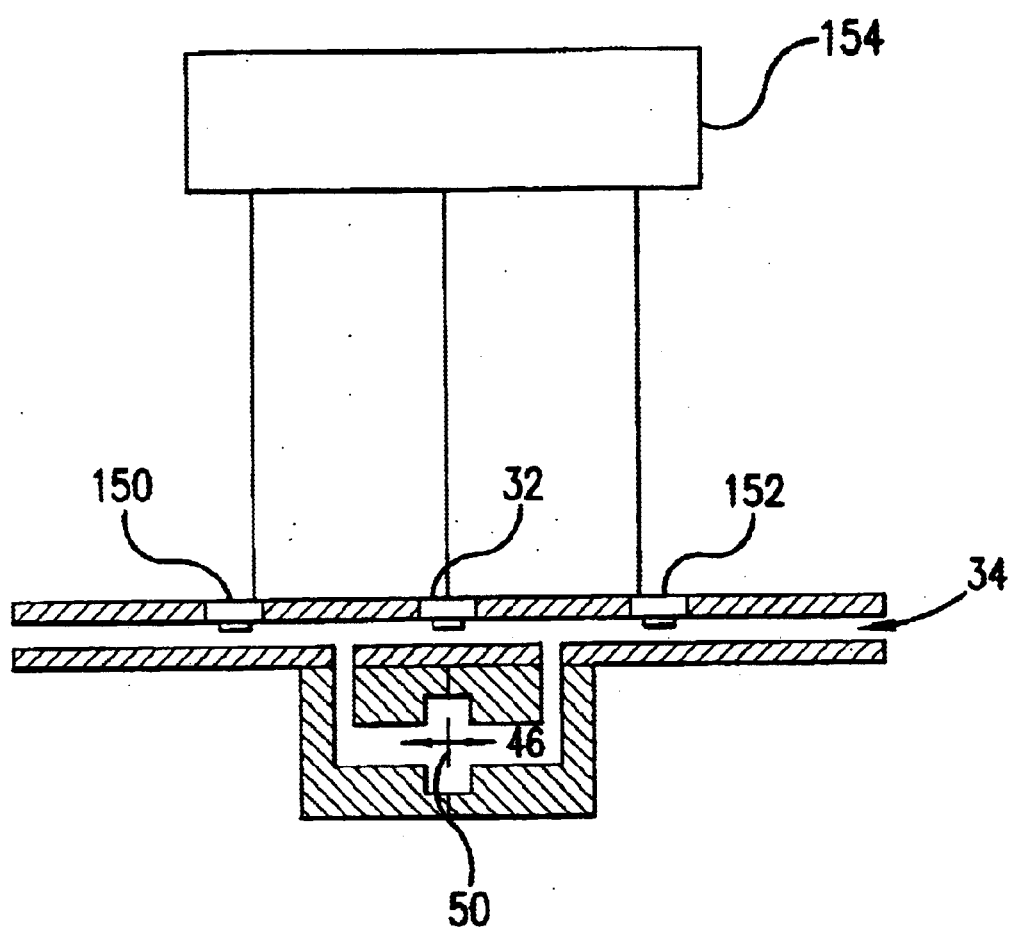
FIG. 13 is side view of an alternative three sensor embodiment in which a dither flow perturbation is measured from a flow sensor disposed upstream of a main flow sensor and another sensor disposed downstream of the main flow sensor.
Figure 14:
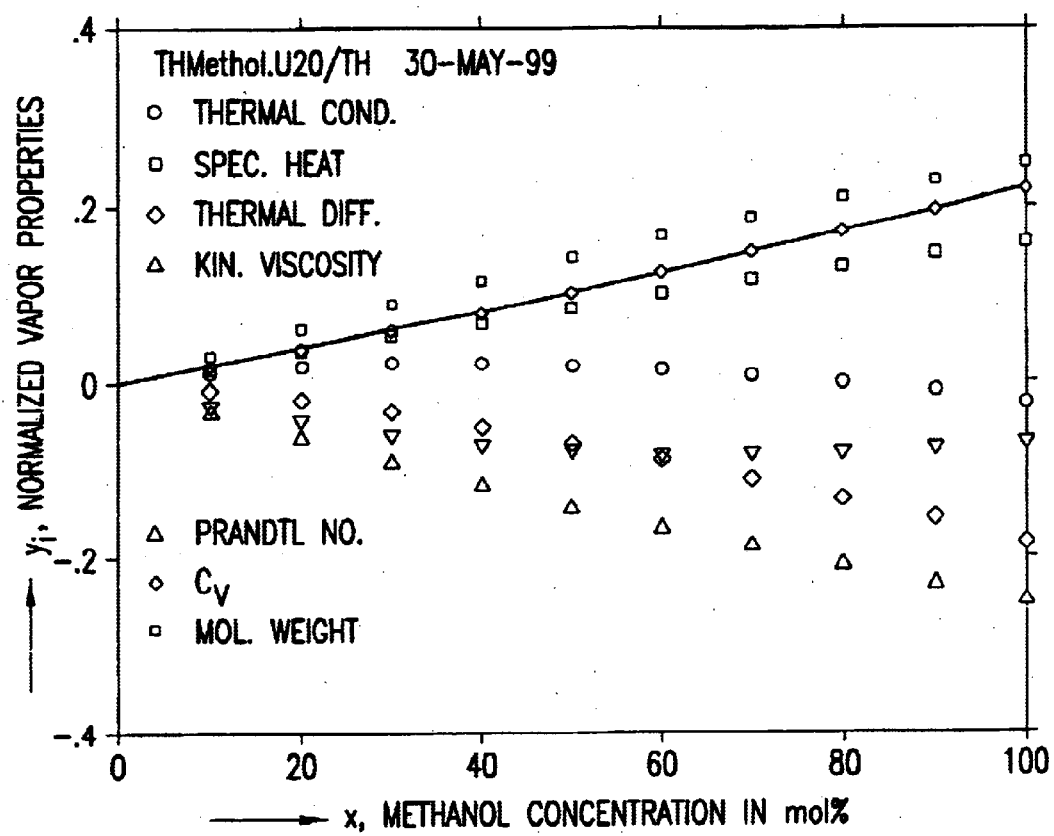
FIG. 14 is a graph of measured properties of a fluid, including $C_v$ values, as a function of mole concentration of methanol vapor in water vapor.

The microprocessor block 122 is programmed to compute the normalized flow rate based on the received data and can be programmed to perform numerous other operations on the data such as deriving a composition concentration from the correction factor as in FIGS. 13 and 14. The control circuitry 36 may exist in a single controller connected to the second self-normalizing flow sensor device 62 or may be implemented by multiple controllers individually connected together and any number of these controllers could be incorporated into the second self-normalizing flow sensor device 62 through known manufacturing techniques. The control circuitry 36 can output the calibrated flow rate to an RS232 port for display to an operator.

Though the above is preferred, alternatively the control circuitry 36 can be slightly modified into a flow sensor calibrating arrangement with feedback loop configuration eliminating the need for the microprocessor 122. The demodulated correction factor sent from the demodulator 126 to the A/D converter 120 could be sent directly to a Wheatstone bridge containing the flow sensor 32, the Wheatstone bridge being used to measure the resistance values of the downstream and upstream sensors of the flow sensor 32 for producing the measured flow rate output. The A/D converter 120 would convert the received analog correction factor signal into an RMS DC signal for connecting to the Wheatstone bridge. In this case, the output from the flow sensor 32 would have been internally calibrated as a result of the feedback loop, leaving no further calibration computation necessary.

Figure 8:
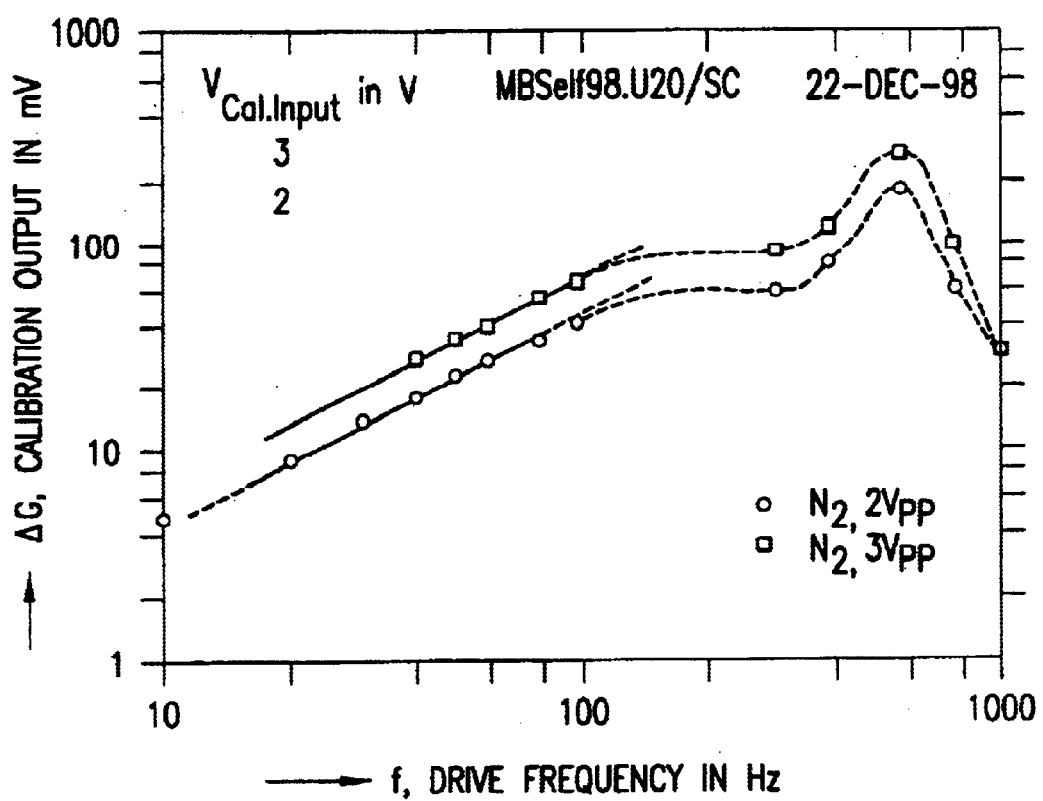
FIG. 8 is a graph of the calibration correction factor, $C_v$, measured by the normalizing sensor of the FIGS. 2–5 as a function of drive frequency of the dither membrane and input voltage for $N_2$ gas for two levels of input voltage.

An advantage of the invention is that the first self-normalizing flow sensor device 30 or the second self-normalizing flow sensor device 62 functions in the on-line flow. In the on-line mode, the dither membrane 50 and the normalizing flow sensor 40 are used to compute the calibration factor, $C_V$. The correction factor, $C_V$, is equal to either the peak-to-peak square-wave or sine-wave RMS output of the normalizing flow sensor 40, i.e., $\Delta G_{cal.\ RMS}$ Exemplary ranges of linearity and non-linearity are shown in FIG. 8, which also shows the effect of different input voltages, peak-to-peak, on the AG output. Thus, to normalize or calibrate the flow signal provided by the flow sensor 32, only the value $C_V$, is derived from the output of the flow sensor 40, eliminating the need for time consuming computations which result from known devices which only measured thermal conductivity and specific heat. Given known formulations for expressing $C_V$ as a function of thermal conductivity, specific heat, Prandtl No., and absolute temperature, expected $C_V$ values for a few gases are: He=0.139759; Ar=0.966175; $CH_4$=0.97 1325; $N_2$=0.9988 16; $C_2H_6$=2.27872; and $C_3H_8$=3.9979.

Exemplary Operation of a Self-normalizing Flow Sensor Device

Figure 9:
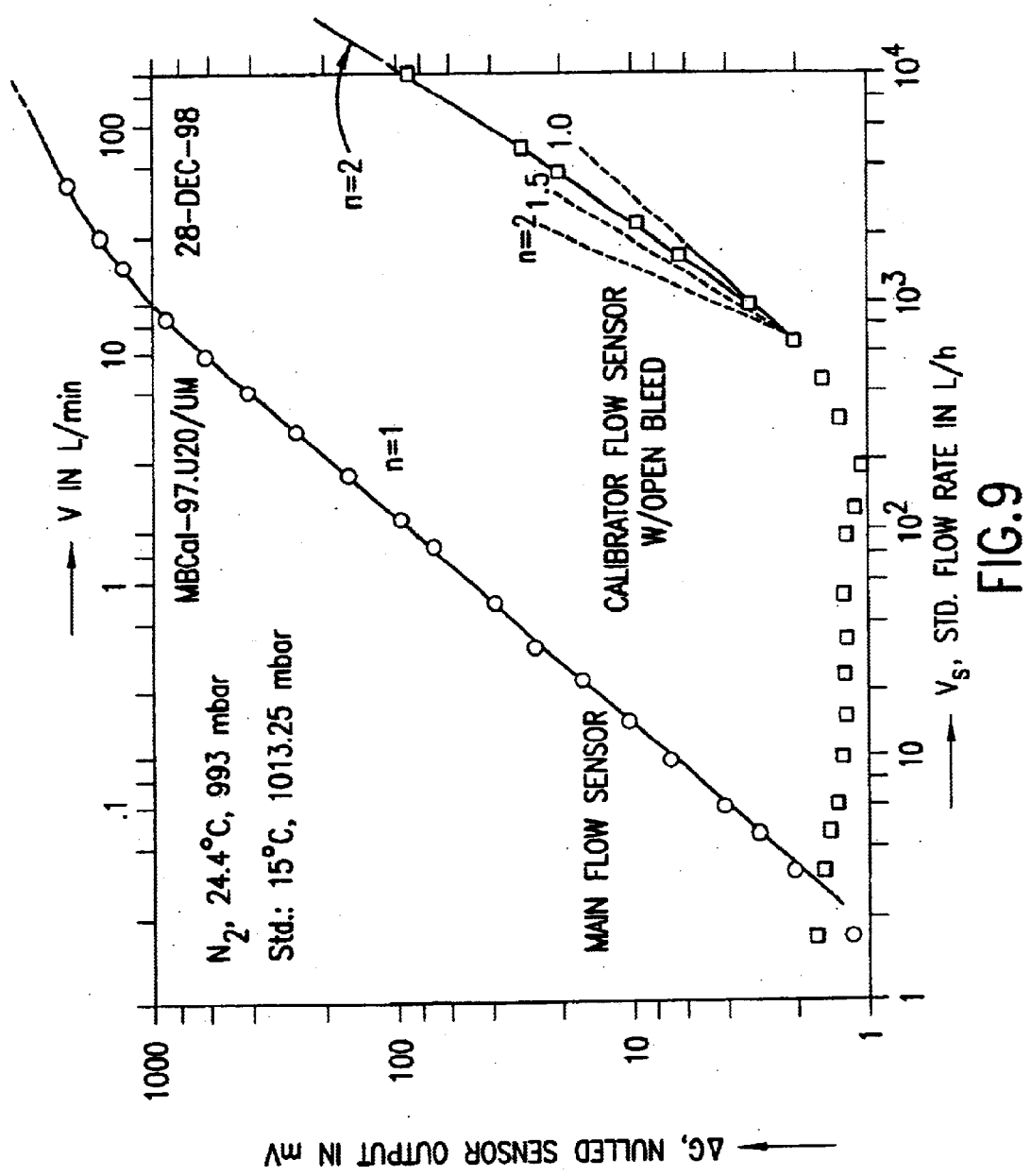
FIG. 9 is a graph of the measured ΔG values for the main flow sensor and the normalizing flow sensor for a flow rate at standard temperature and pressure.

In one example of the implementation of the second self-normalizing flow sensor device 62, the ΔG measured as a function of the standard flow rate, Vs (L/h), of a $N_2$ gas at 24.4° C. and 993 mbars of pressure is shown in FIG. 9. For this measurement, the flow channel 34 had an inner diameter of 12.5 mm, and the flow sensors 34, 40 were both AWM43300 microbridge flow sensors. Furthermore, three honeycomb flow straighteners of ⅛" cell size were disposed in the flow channel 34. The bleed hole 82 had an inner diameter of 0.25 mm. With the bleed hole 82 closed by the bleed valve 72, however, the measured ΔG values are more accurate because the bleed-hole shunt flow shown by the square points in FIG. 9 do no reduce the flow sensed by the flow sensor 32. As shown by the measured data of the normalizing flow sensor output with the bleed hole open, the effect of the bleed hole in the open position on the flow rate of the fluid in the sensing channel 46 is negligible except below about 10 L/h and above about 600 L/h of flow in the main channel.

Figure 10:
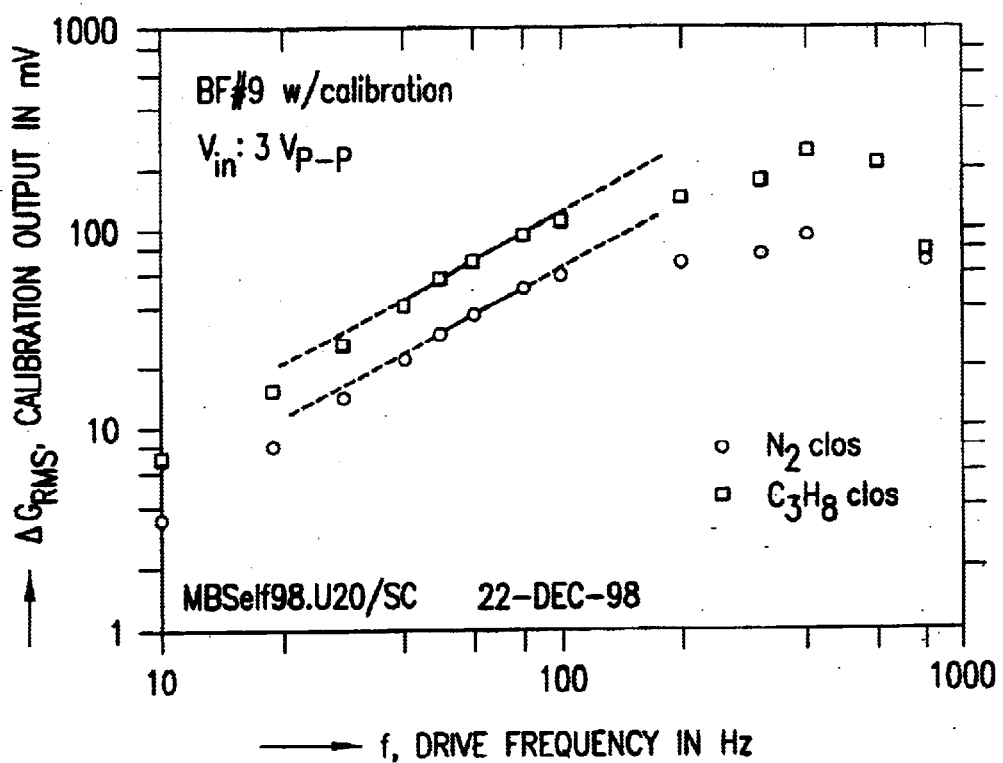
FIG. 10 is a graph of the computed $\Delta G_{RMS}$ as a function of drive frequency for fluids of different composition.

The input wave forms to the actuator 53 and the corresponding normalizing flow sensor 40 were sinusoidal wave forms of between approximately 10 Hz to 850 Hz. Though a triangular wave can be used to drive the actuator 53, it was found that a sinusoid wave form produced better signal-to-noise ratios at the output, and therefore is preferred. FIG. 8 demonstrates that for $N_2$ gas a region of linearity over this drive frequency range was found to exist between about 10 Hz to 100 Hz. FIG. 10 shows a similar range of linearity for propane.

FIG. 10 shows the $\Delta G_{RMS}$ output of the normalizing flow sensor 40 as a function of the drive frequency of the actuator 53 for two different gases. Given a 3 Vpp input sine wave, a 4 to 40 L/h RMS signal was measured for $\Delta G_{RMS}$ between 10 and 100 Hz drive frequency.

Figure 11:
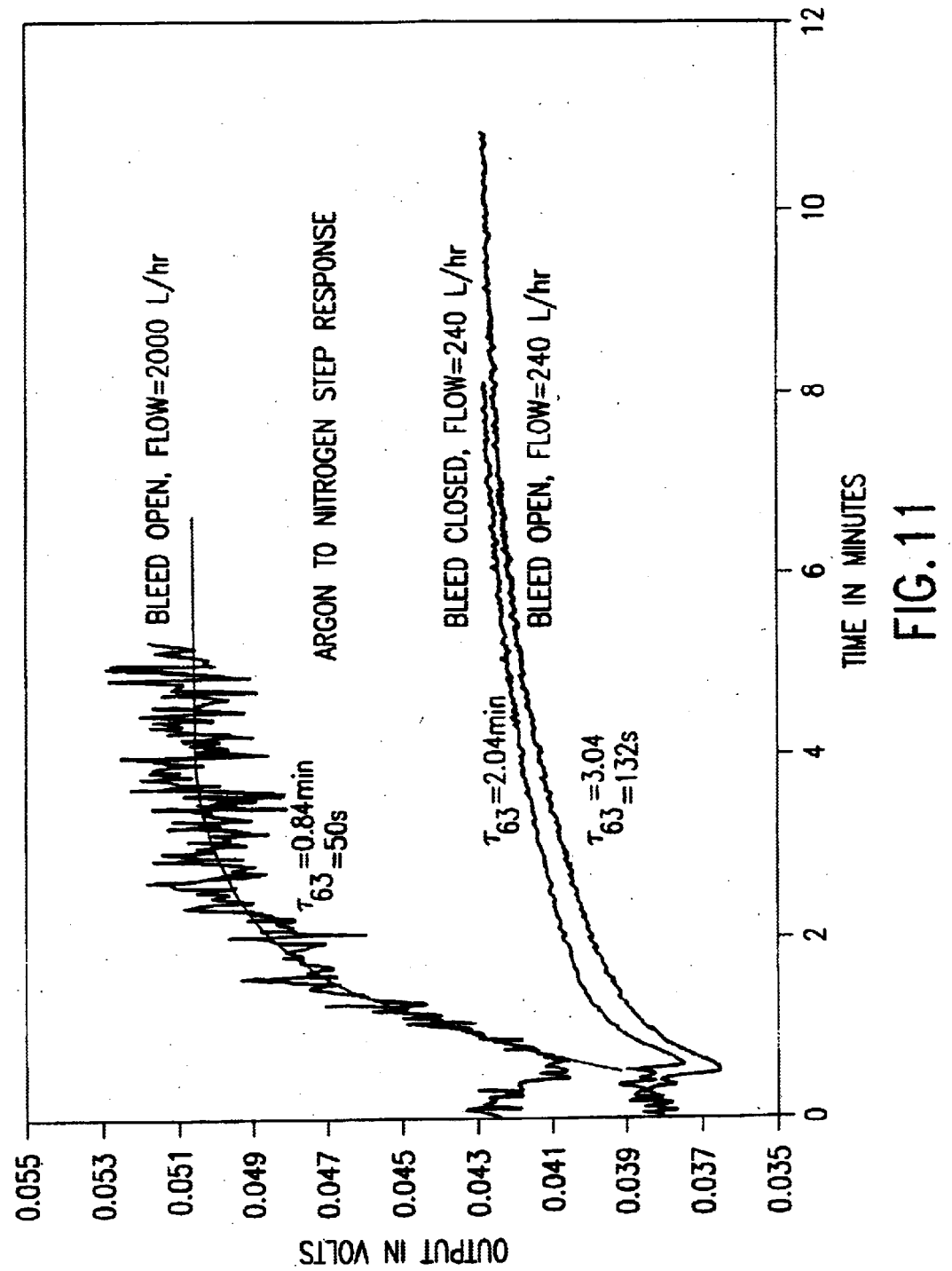
FIG. 11 is a graph of the purge times of the apparatus of FIG. 2 at two flow rates with a bleed hole open and closed.

To determine the responsiveness of the system under different conditions, the purge response times for changes in gaseous fluid composition as the second self-normalizing flow sensor device 62 was switched from measuring He to $N_2$ and $C_3H_8$ to He were measured. Response times of approximately 60 seconds to 100 seconds were measured. During these measurements, the bleed hole 82 was closed by the bleed valve 72. Response times for a change in gas composition from Ar to $N_2$ with the bleed hole 82 open are shown in FIG. 11, from which it is apparent that longer response times result when the bleed hole is open. Furthermore, data measured with the bleed hole 82 closed resulted in more accurate measures with better signal-to-noise ratios. The bleed hole 82 is preferably left in the open position only during purging of the flow channel.

Figure 12:
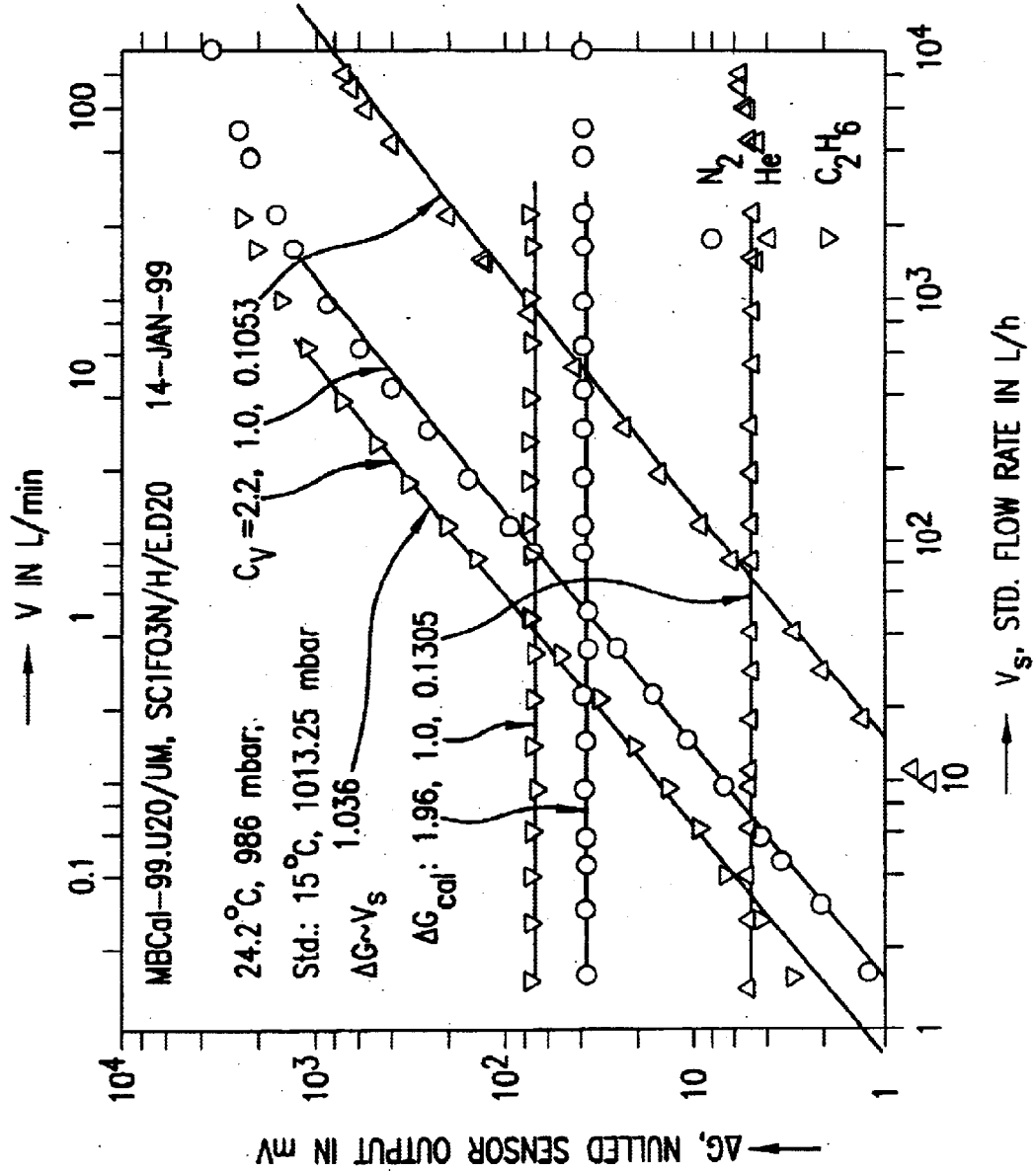
FIG. 12 is a graph of the uncalibrated flow rates measured by the flow sensor for different fluids and the calibration factor, $\Delta G_{cal} = C_v$, measured by the normalizing sensor for the same fluids.

FIG. 12 is similar to FIG. 9 except that it shows measurements of both the flow sensor 32 and the normalization sensor 40 for three different gases. The horizontal nature of the ΔG output for the normalization sensor 40 confirms that ΔG is substantially independent of flow rate for flow rates below approximately 4000 L/h.

FIG. 13 shows an alternative embodiment of the invention in which a three sensor arrangement is used. As with the embodiments described above, the flow sensor 32 is disposed to measure the flow rate of a fluid traveling in the flow channel 34. Like FIG. 1, the flow sensor 32 is disposed within the flow channel 34 and not in a bypass channel. In parallel with the flow channel, the dither membrane 50 is in the dither sensing channel 46. Though still amounting to only relatively small perturbations in comparison to the flow rate of the fluid in the flow channel 34, the dither flow created by the dither membrane 50 will alter the flow rate of the fluid in the main channel upstream and downstream of the flow sensor 32, and at flow sensor 32, because of the two port bypass arrangement. Thus, an upstream flow sensor 150 and a downstream flow sensor 52 are positioned within the flow channel 34. Both flow sensors 150, 152 are ostensibly the same as flow sensor 32 in type and, as such, measure a flow rate of the fluid. The measured values from these two flow sensors 150, 152 are communicated to control circuitry 154 which calibrates the measurement of the flow sensor 32 by determining the difference between the two measured values. This difference being attributable primarily to the affect of the reciprocating dither membrane 50.

Figure 15:
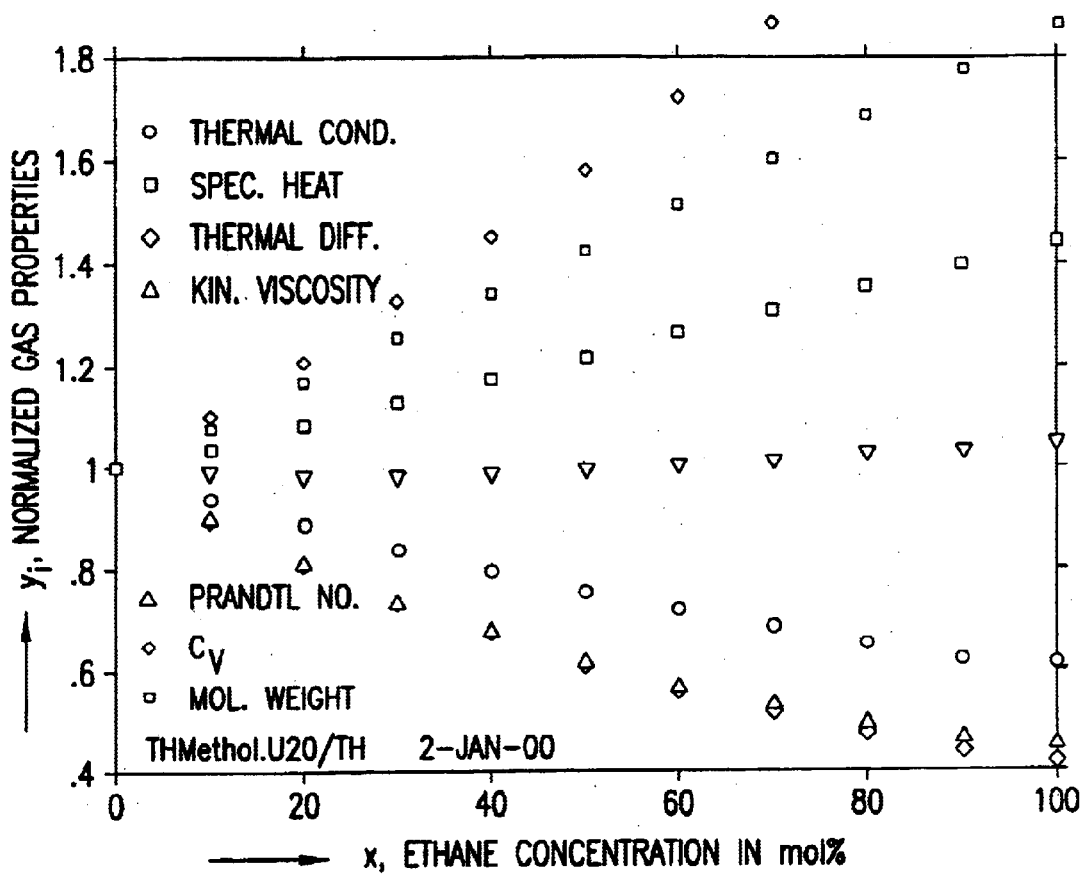
FIG. 15 is a graph of measured properties of a fluid, including $C_v$ values, as a function of mole concentration of ethane in methane gas.

In addition to using the measured ΔG value to calibrate the flow sensor, as the graphs in FIGS. 14 and 15 show, the measured $C_v$ value can also be used to characterize a binary-composition fluid and determine its mole composition, without the need of the flow sensor 32. In the examples of FIGS. 14 and 15, the value of the $C_v$ signal is substantially linear and substantially the strongest over the entire range of concentrations from 0% to 100%, whereas many other parameters, except for mole weight, demonstrate nonlinear characteristics over this region. Therefore, the invention discloses that the measurement of $C_v$ can be used to determine composition of mixtures, primarily binary mixtures at an affordable cost.

Moreover, having now derived a simple approach to determine correction factor $C_V$ it will readily apparent to those of ordinary skill in the art that the above embodiments can be used to derive higher value properties of fluids via correlations between $C_V$ and other measurable properties (thermal conductivity and specific heat). Among these high value properties are properties such as compressibility factor, density, viscosity, heating value, oxygen demand, octane number, and cetane number. Because the $C_V$, thermal conductivity, and specific heat value correlates to each of these higher value properties based on known functional relationships, such relationships would preferably be polynomial to allow the use of inexpensive computational microprocessors which can produce outputs in a relatively short time. However, the known log, exponential or other functional relationships could also be used and would be readily apparent.

Those of ordinary skill in the art will appreciate that, although the teachings of the invention have been illustrated in connection with certain embodiments, there is no intent to limit the invention to such embodiments. On the contrary, the intention of this patent is to cover all modifications and embodiments fairly falling within the scope of the appended claims either literally or under the doctrine of equivalents.

What is claimed is:

1. A method of determining a higher value property of a fluid, the method comprising the steps of:
   providing a main fluid flow in a flow channel;
   providing a flow sensor in said main flow channel;
   receiving a portion of said fluid from said main fluid flow in said flow channel to form a received portion, a remaining portion of said fluid continuing in said main fluid flow in said flow channel;
   creating a dither flow of said received portion by imposing a dithering motion on said received portion to form a dithered fluid;
   measuring said dither flow rate of said dithered fluid to form a measured dither flow rate;
   deriving a correction factor from said measured dither flow rate;
   applying said correction factor to said flow sensor in said main flow channel; and
   determining said higher value property based upon the measured dither flow rate and other measured properties.

2. The method of claim 1, wherein the step of measuring said dither flow rate comprises the step of providing a flow sensor in a channel containing said received portion to measure said dither flow rate of said dithered portion.

3. The method of claim 1, wherein said fluid is a binary mixture.

4. The method of claim 1, wherein said higher value property is one of the group consisting of: compressibility factor, density, viscosity, heating value, oxygen demand, octane number, and cetane number.

5. A method as claimed in claim 1, wherein said other measured properties include thermal conductivity of the fluid and specific heat of the fluid.

6. A method as claimed in claim 1, wherein said step of determining includes applying functional relationships of the higher value properties to said measured dither flow rate and said other measured properties.

7. A method as claimed in claim 6, wherein said functional relationships are polynomial relationships.

8. A method of determining a higher value property of a fluid, the method comprising the steps of:
   providing a main fluid flow in a flow channel;
   receiving a portion of said fluid from said main fluid flow in said flow channel to form a received, portion a remaining portion of said fluid continuing in said main fluid flow in said flow channel;
   creating a dither flow of said received portion by imposing a dithering motion on said received portion to form a dithered fluid;
   measuring said dither flow rate of said dithered fluid to form a measured dither flow rate; and
   determining said higher value property based upon the measured dither flow rate and other measured properties, wherein said step of determining includes applying functional relationships of the higher value properties to said measured dither flow rate and said other measured properties, wherein said functional relationships are one of log and exponential relationships.

9. A method for determining a higher value property of a fluid, comprising the steps of:
   receiving said fluid in a fluid chamber;
   imposing a dither flow on said fluid in said fluid chamber;
   measuring said dither flow using a dither flow sensor;
   generating a correction factor from an output of said dither flow sensor;
   measuring at least one further measurable property of said fluid; and
   determining said higher value property from said correction factor and said at least one further measurable property from a functional relationship;
   wherein said step of generating includes determining a peak-to-peak root-mean squared value of said output of said flow sensor.

10. A method for determining a higher value property of a fluid, comprising the steps of:
    receiving said fluid in a fluid chamber;
    imposing a dither flow on said fluid in said fluid chamber;
    measuring said dither flow using a dither flow sensor;
    generating a correction factor from an output of said dither flow sensor;
    measuring at least one further measurable property of said fluid;
    determining said higher value property from said correction factor and said at least one further measurable property from a functional relationship;
    providing a main fluid flow in a main fluid flow channel; and
    said step of receiving said fluid in said fluid chamber includes receiving a portion of said fluid from said main flow channel as a by-pass from said main fluid flow;
    measuring a flow rate of said fluid in said main fluid flow channel using a main channel flow sensor;
    applying said correction factor to said main channel flow sensor.

11. A method as claimed in claim 10, wherein said higher value property is one of the group consisting of: compressibility factor, density, viscosity, heating value, oxygen demand, octane number, and cetane number.

12. A method as claimed in claim 10, wherein said fluid chamber is of a fixed size and said dither flow is imposed by a fixed dither frequency.

13. A method as claimed in claim 10, wherein said step of generating includes demodulating said output of said dither flow sensor.

14. A method as claimed in claim 10, wherein said at least one further measurable property includes at least one of thermal conductivity and specific heat of said fluid.

* * * * *